United States Patent [19]
Swenson

[11] Patent Number: 4,759,579
[45] Date of Patent: Jul. 26, 1988

[54] PIG EXTRACTOR

[76] Inventor: Alvin L. Swenson, P.O. Box 71, Fairfield, N. Dak. 58627

[21] Appl. No.: 48,875

[22] Filed: May 12, 1987

[51] Int. Cl.[4] ............................................. B25J 1/00
[52] U.S. Cl. .................................. 294/19.1; 294/26; 294/90; 294/97
[58] Field of Search .................. 294/15, 91.1, 22, 26, 294/61, 66.1, 86.24, 86.27, 86.29, 86.32, 86.33, 86.4, 90, 93, 97, 99.1, 113, 120, 126–130; 15/104.06 A, 104.3 G, 104.3 SN; 81/3.48, 3.49; 254/134, 3 FT, 134.7

[56] References Cited

U.S. PATENT DOCUMENTS

| | | | |
|---|---|---|---|
| 32,394 | 5/1861 | Wyckoff | 81/3.49 |
| 1,130,775 | 3/1915 | Toffey | 254/134.3 FT |
| 1,332,043 | 2/1920 | Keith | 81/3.49 |
| 1,408,472 | 3/1922 | Rohder | 294/26 X |
| 1,602,406 | 10/1926 | Gagne | 81/3.49 |
| 1,725,814 | 8/1929 | McCormick | 294/90 X |
| 1,734,807 | 11/1929 | Herman | 294/86.24 |
| 2,076,837 | 4/1937 | Grimmelsman | 175/254 |
| 2,610,082 | 9/1952 | Hill | 294/97 |
| 2,661,978 | 6/1951 | Lauro | 294/113 |
| 2,957,723 | 10/1960 | Walls et al. | 294/86.4 |
| 3,203,606 | 8/1965 | Masterson, Jr. | 294/137 |
| 3,232,090 | 2/1966 | Walker | 73/3 |
| 3,303,525 | 10/1963 | Peoples et al. | 15/104.06 |
| 3,779,270 | 12/1973 | Davis | 137/268 |
| 3,809,113 | 5/1974 | Grove et al. | 137/268 |
| 4,016,621 | 4/1977 | Slegers et al. | 15/104.06 A |
| 4,401,133 | 8/1983 | Lankston | 137/268 |

Primary Examiner—Johnny D. Cherry
Attorney, Agent, or Firm—Stevens, Davis, Miller & Mosher

[57] ABSTRACT

A pig extractor for extracting pigs from a pipe or conduit. The extractor has an elongated shaft with a handle at one end and a spring latch at an opposing end.

8 Claims, 1 Drawing Sheet

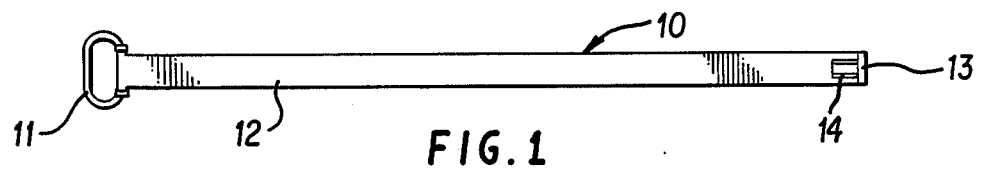
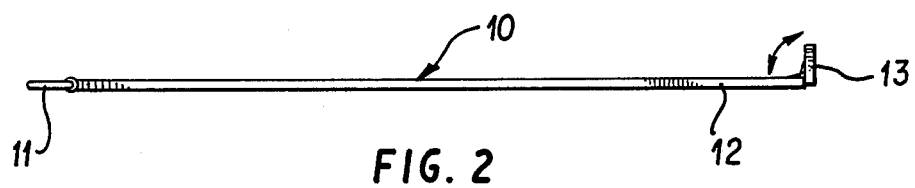
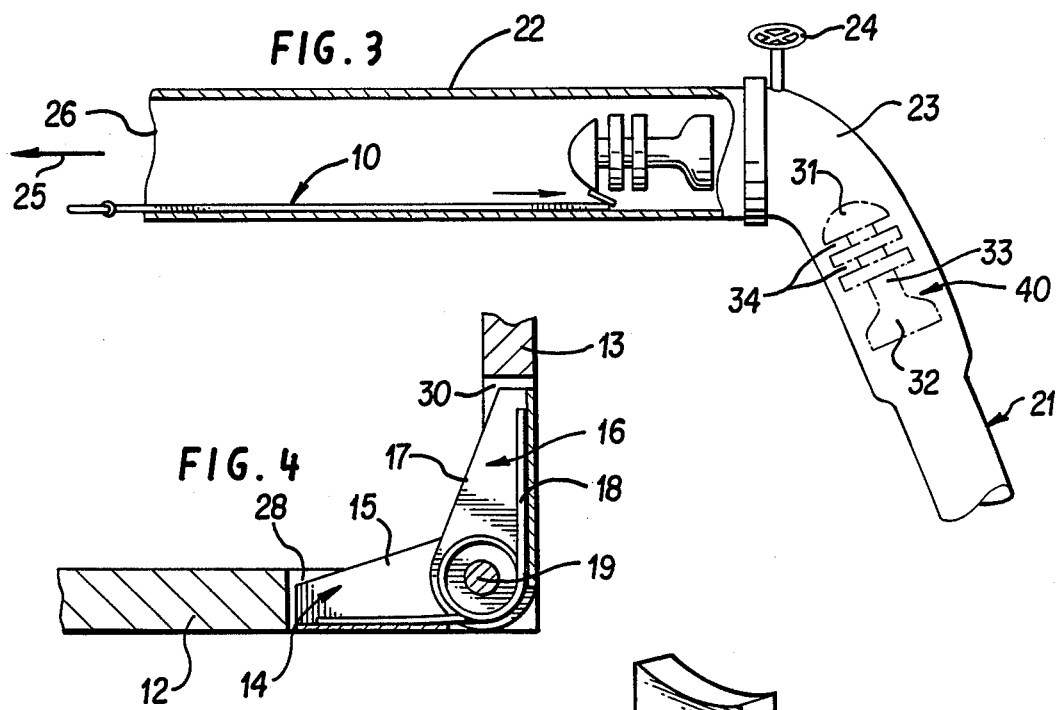
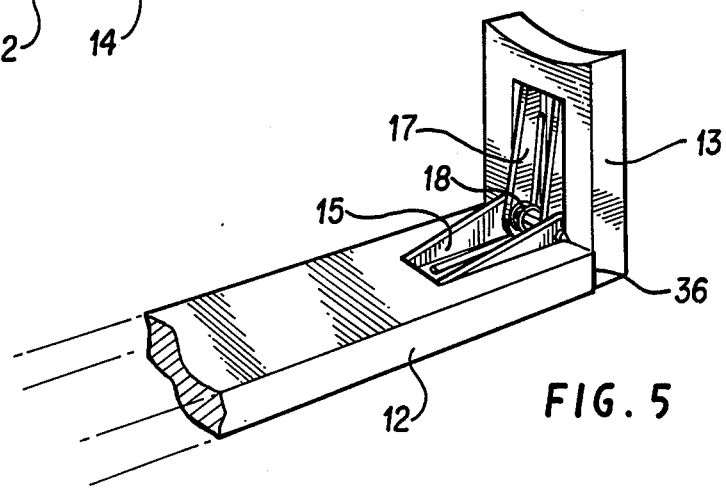

PIG EXTRACTOR

BACKGROUND OF THE INVENTION

1. Field of the Invention

This invention relates to a device for retrieving pipeline pigs.

2. Discussion of the Prior Art

A pig is a device which is caused to flow through fluid hydrocarbon conveying pipe lines or conduits as an aid for removing undesired deposits which form on the inside surfaces of the pipe or conduit. Pigs may also be employed as markers. For example a pig may be inserted between separate charges of different fluids to indicate the end of a specific charge and the beginning of another charge. Pigs take the form of shperiods or plugs or torpedo type configurations which have diameters slightly smaller than the inner diameter of the pipes or conduits. Pigs may be constructed of a variety of materials such as resilient foam, rubber, or metals such as stainless steel or aluminum.

There are known devices which allow an operator to retrieve pigs. Such devices include a pig receiver and relatively large structures of cooperating parts to extract the pigs through an opening of the receiver. Such structures are disclosed in U.S. Pat. Nos. 3,232,090 and 3,809,113.

SUMMARY OF THE INVENTION

The present invention relates to a simple elongated tool for removing pigs from the opening of a pig receiver. More particularly the invention relates to a pig extractor comprising an elongated shaft having a proximal and distal end, a finger means and means for pivotally connecting the finger to the distal end of the shaft, the finger being biased to be substantially perpendicular to said shaft and being resiliently movable from a substantially perpendicular position to positions whereby the shaft and the finger from acute angles when a force is applied to an outside surface of the finger.

BRIEF DESCRIPTION OF THE DRAWINGS

FIG. 1 is a plan view of the pig extractor of the present invention;

FIG. 2 is a side elevational view of the pig extractor of the present invention;

FIG. 3 is an elevational view partly in section of a pipeline and pig receiver showing the pig extractor in use;

FIG. 4 is an elevational view, partly in section showing the shaft/finger connection of the pig extractor.

FIG. 5 is perspective view of the shaft/finger connection.

DESCRIPTION OF THE PREFERRED EMBODIMENT

FIGS. 1 and 2 show the pig extractor 10 of the invention. If the extractor is used in a hydrocarbon environment the extractor parts are made from materials that do not generate sparks. Such materials include aluminum and stainless steel. Such a precaution is necessary when working with the extractor in a volatile hydrocarbon environment. The extractor has a handle 11, a flat elongated shaft 12, a pivotally mounted finger 13 and means for connecting the finger to the elongated shaft. As shown in FIG. 2, the finger 13 is biased to be substantially perpendicular to shaft 12.

Finger 13 is attached to the distal end of shaft 12 opposite the handle. The top of the finger has a somewhat rounded edge to permit the finger to not only retrieve pigs having the configuration shown and described herein but also pigs of a spherical configuration as well. The finger/shaft attachment is one that allows the finger 13 to be movable so that finger 13 may form acute angles or overlie, elongated shaft 12 as shown in FIG. 3. Such an attachment may include a pin type hinge arrangement connecting the finger and shaft and a torsional spring connected to the hinge. Such an arrangement is shown in FIGS. 4 and 5 and the entire structure shown may be described as a spring biased latching device. As shown, the distal end of shaft 12 has a cutout portion 28 forming a cavity in the shaft surface and the hinged end of finger 13 preferably has a similar cutout portion 30 forming a corresponding cavity. Welded into the cutout portion 28 of the shaft 12 is a hinge leaf 14. Hinge leaf 14 has a flattened "U" shape cross-section and sides 15 that are progressively elevated. A second hinge leaf 16 is positioned in the cutout of the finger and leaf 16, like leaf 15, has progressively elevated sides 17. Leaf 16, however, is slightly narrower than leaf 15 for reasons discussed below. The hinge leaves 15 and 16 are positioned within the cavity formed by cutouts 28 and 30 so that the ends of the leaves, having the elevated sides are interdigitated. In view of the fact that leaf 16 is narrower than leaf 15, the elevated sides of leaf 16 nest between the elevated sides of leaf 15. The elevated sides of both leafs have aligned apertures for receiving hinge pin 19. Hinge pin 19 thus pivotally connects shaft 12 to finger 13. A torsional spring 18 is mounted on the hinge pin 19 so that finger is biased to a perpendicular position when no forces are acting on the outside face of finger 13. When the force is removed the torsional spring 18 will return the finger to the perpendicular position. The finger is prevented from forming obtuse angles relative to the shaft because the hinged end of finger 13, as shown in FIG. 5, in the perpendicular position, overlaps and abuts the end engagement surface 36 of shaft 12. As seen in FIG. 5, the width of the finger 13 is substantially equal to the width of the elongated shaft and the width of the engagement surface 36.

Pigs 40 have a blunt shaped torpedo head 31, a tail 32, and a body 33 which connects the head and tail sections. The body is constructed so that circumferential slots 34 are formed between the head and body, body and tail, and in the midsection of the body. The shape of the pig is not critical; however, pigs must be of dimensions whereby they may be conveyed through fluid coneying pipe so that the interior walls of the pipe may be cleaned while the pig travels through the pipe. A properly designed pig will therefore have an outer diameter slightly smaller than the inner diameter of the fluid conveying pipe. With such dimensions of pig being conveyed through the fluid conveying pipe or conduit network 21 will randomly strike or scrape against the inside surface of such equipment thus knocking loose accumulated obstructing deposits which can be flushed or backwashed out of the pipe or conduit network 21. Pigs 40 may be continuously conveyed through the pipe or conduit network 21 until an operator is convinced that pigs 40 have cleaned the inside surfaces of the fluid conveying pipe or conduit network 21. When the inside surfaces of the pipe network 21 are cleaned pigs 40 must be removed. A pig receiver 22 collects pigs 40 and the subject pig extractor 10 is used to remove them from the system.

As seen in FIG. 3, pig receiver 22 is connected to pig feed pipe 23 through gate valve 24, and the pig feed pipe 23 is connected to pipe network 21. Pig feed pipe 23 has an inner diameter larger than that of pipe network 21 so that pigs 40 can gain easy access to pig feed pipe 23. When gate 24 is open pigs 40 enter pig receiver 22 through pig feed pipe 23.

As shown in FIG. 3 pig extractor 10 lies flat along one inside wall of the pig receiver 22. The pig receiver has an inner diameter equal to that of the pig feed pipe. Such a construction allows the pig extractor to be positioned between the pigs and the inside wall of the pig receiver. After a pig 40 enters receiver 22 the pig extractor can be pushed longitudinally into the receiver so that the pig will strike the outside face of finger 13 of extractor 10. The force of the impact of the pig on the face of the finger is sufficient to cause torsional spring 18 to yield under the force of the pig causing the finger to move toward the flat elongated shaft 12. Finger 13 thus forms acute angles with or overlies the elongated shaft 12 of extractor 10. The pivoted finger will travel over the length of the pig exposing a slot 34 to the finger. The finger, due to the torsional spring 18, will snap into a slot 34 returning substantially to the perpendicular or normal position. On the other hand the pig extractor may be left in the receiver so that the incoming pig will travel over the extractor. As the pig continues to travel, head 31 or body portion 33 will strike finger 13, ride thereover and expose a slot 34 to the finger. Pig 40 may continue in this manner until it completely passes over finger 13. A second, or additional pigs may also be conveyed over finger 13 of extractor 10 as described above until a number of pigs are aligned head-to-tail over the elongated shaft and forward of finger 13. The extractor 10 is then withdrawn from the pig barrel in the direction of the arrow 25. The finger, capable of only movement in the direction of the elongated shaft will latch onto a pig at the tail end or behind a head or behind a body part and will resist bending in directions away from the elongated shaft, and assist in driving the pigs through the opening or barrel 26 of the pig receiver. The pigs in front of the pig being driven by the extractor 10 will also be driven out of the pig barrel. The extractor 10 can then be reinserted within the barrel to remove additional pigs. Extractor 10 may be used to retrieve one pig at a time. The extractor 10 may be conveniently housed in the pig barrel until pigs 40 are to be retrieved.

While specific embodiments of the pig extractor have been shown and described, it should be apparent that many modifications can be made thereto without departing from the spirit and scope of the invention. Accordingly, the invention is not limited by the foregoing description, but is only limited by the scope of the claims appended thereto.

What is claimed is:

1. A pig extractor for removing a pig from a pipeline, said extractor comprising an elongated shaft having a proximal end and a distal end, said shaft having a generally flat surface along at least a portion of its length, a non-resilient finger and means for pivotally connecting the finger to the outer surface of said shaft, said finger having an inner surface and being pivotally mounted so that said inner surface is adjacent to said flat surface when said finger is pivoted to a position generally parallel to said flat surface, biasing means between said shaft and said finger to bias said finger to a position substantially perpendicular to said shaft, a cavity formed between said shaft and said inner surface by at least one of said shaft or said finger having a cutout portion, said biasing means being housed in said cavity, said finger being resiliently movable from said substantially perpendicular position to positions whereby the shaft and finger form acute angles when a force is applied to an outside surface of the finger.

2. The pig extractor of claim 1, in which the biasing means is a torsional spring, and wherein said pivotally connecting means is a hinge pin, said hinge pin including means for mounting said torsional spring and wherein said hinge pin, finger, and torsional spring form a spring latch.

3. The pig extractor of claim 2, further comprising a handle integral with the proximal end of the shaft.

4. The pig extractor of claim 1, in which, opposite to the pivotally connecting means, said finger has an end shaped to engage said pig.

5. A pig extractor for removing a pig from a pipeline, said extractor comprising:
   an elongated shaft having a proximal end and a distal end, said distal end having an engagement surface;
   a finger having an inner surface and means pivotally mounting said finger at said distal end so that a portion of said inner surface overlaps and contacts said engagement surface when said finger is pivoted to be substantially perpendicular to said elongated shaft, said contact acting to limit pivotal movement in one direction;
   at least one of said shaft or said finger having a cutout portion, a biasing means housed in said cutout portion, said biasing means acting to maintain said finger in said substantially perpendicular position but permitting said finger to pivot to a position substantially parallel with said shaft so that said cutout portion and said biasing means are covered by said finger when said finger is pivoted to said substantially parallel position.

6. The pig extractor of claim 5, in which said biasing means is a torsional spring and said pivotally mounting means is a hinge pin mounted within said cutout portion.

7. The pig extractor of claim 5, in which, opposite to the pivotally mounting means, the finger has an end shaped to engage said pig.

8. The pig extractor of claim 5 wherein the width of the finger is substantially equal to the width of the elongated shaft and the width of the engagement surface.

* * * * *